United States Patent [19]

Kwis et al.

[11] Patent Number: 4,917,907
[45] Date of Patent: Apr. 17, 1990

[54] PIE HAVING A MICROWAVE BROWNABLE CRUST AND METHOD OF BAKING SAME

[75] Inventors: Stanley H. Kwis, Mt. Laurel; Robert H. Fleming, Collingswood; John P. O'Meara, Haddonfield; Warren A. Widicus, Vincentown, all of N.J.

[73] Assignee: Campbell Soup Company, Camden, N.J.

[21] Appl. No.: 85,373

[22] Filed: Aug. 14, 1987

[51] Int. Cl.⁴ .............................................. H05B 6/80
[52] U.S. Cl. ........................................ 426/90; 426/92; 426/94; 426/107; 426/113; 426/243; 426/557
[58] Field of Search ............... 426/107, 243, 113, 557, 426/92, 94, 90, 132

[56]  References Cited

U.S. PATENT DOCUMENTS

| | | | |
|---|---|---|---|
| 2,172,211 | 1/1938 | Lloyd | 426/555 |
| 3,835,280 | 9/1974 | Gades et al. | 219/10.55 E |
| 4,027,132 | 5/1977 | Levinson | 219/10.55 E |
| 4,190,757 | 2/1980 | Turpin et al. | 426/107 |
| 4,252,832 | 2/1981 | Moody | 426/241 |
| 4,283,427 | 8/1981 | Winters et al. | 426/107 |
| 4,306,133 | 12/1981 | Levinson | 219/10.55 E |
| 4,448,791 | 5/1984 | Fulde et al. | 426/243 |
| 4,450,334 | 5/1984 | Bowen et al. | 219/10.55 E |
| 4,529,607 | 7/1985 | Lenchin et al. | 426/94 |
| 4,542,271 | 9/1985 | Tanonis et al. | 219/10.55 E |
| 4,555,605 | 11/1985 | Brown et al. | 426/107 |
| 4,590,349 | 5/1986 | Brown et al. | 219/10.55 E |
| 4,592,914 | 6/1986 | Kuchenbecker | 426/107 |
| 4,594,492 | 6/1986 | Maroszek | 219/10.55 E |
| 4,626,641 | 12/1986 | Brown | 426/243 |
| 4,640,837 | 2/1987 | Coleman et al. | 426/94 |
| 4,641,005 | 2/1987 | Seiferth | 426/243 |
| 4,642,434 | 2/1987 | Cox et al. | 426/243 |
| 4,661,671 | 3/1987 | Maroszek | 426/243 |
| 4,663,506 | 5/1987 | Bowen et al. | 426/243 |
| 4,703,148 | 10/1987 | Mikulski et al. | 426/243 |
| 4,713,510 | 12/1987 | Quick et al. | 426/243 |

OTHER PUBLICATIONS

Pet-Ritz Pie Crust Shells Packaging Label sold in the U.S. at least as early as Sep. 1986.

*Primary Examiner*—Donald E. Czala
*Assistant Examiner*—Mary S. Mims
*Attorney, Agent, or Firm*—Banner, Birch, McKie & Beckett

[57]  ABSTRACT

A pie, such as a meat or fruit pie, having a bottom crust which is suitable for baking and browning in a microwave oven is provided. A preferred bottom crust contains a reducing sugar such as dextrose, an amino acid source such as whey solids, a dough conditioner to prevent dough shrinkage and a leavening agent to enhance browning and to provide a puffy crust. The pie filling contains less than 90 weight % water. The pie is supported in a tray composed of a microwave-interactive material which heats upon exposure to microwaves. The bottom crust of the pie browns as a result of several browning phenomena including low temperature Maillard browning reactions and high temperature caramelization reactions.

25 Claims, 1 Drawing Sheet

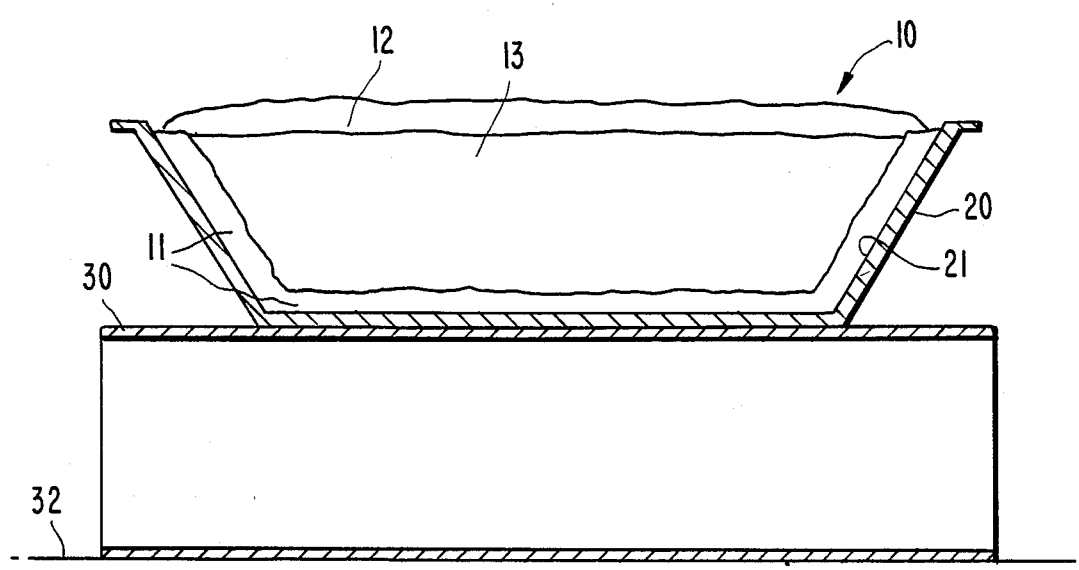

PIE HAVING A MICROWAVE BROWNABLE CRUST AND METHOD OF BAKING SAME

BACKGROUND OF THE INVENTION

1. Field of the Invention

The present invention relates to a product which is baked in a microwave oven. More particularly, this invention relates to a pastry or pie, having a bottom crust composed of a dough which is suitable for baking and browning in a microwave oven, and to a method of baking same.

2. Description of the Prior Art

In recent years, the number of homes containing microwave ovens has grown dramatically. This has resulted in an associated growth in the demand for microwave compatible foods, especially frozen foods such as pizzas, meat pies, fruit pies, quiches and other products having a crust. One very significant disadvantage of microwave cooking, however, is the absence of surface browning reactions with many food products. While simple expedients such as coating with sauces and the like may be effective to provide the desired coloring or browning to meat products and the like, these methods have not proven practicable for products contain an unbaked pastry crust. In such a product, a true browning of the crust itself is required to make the cooked product acceptable to most consumers. While such a product may be adequatedly cooked in a microwave oven, its resulting "unbrowned" appearance severely limits its consumer acceptability.

Moody U.S. Pat. No. 4,252,832 discloses a syrup-like composition for use in coating food products to be cooked in a microwave oven. This syrup is said to affect a desired browning of various foods when cooked in a microwave oven, including frozen pies and pastries. The Moody syrup composition comprises a disaccharide, water and preferrably a minor amount of monosaccharide. Salt is optionally added to the composition to counteract the sweetness of the saccharides when the sweetness is undesirable. In view of current trends by consumers toward reduction of their intake of sugars and salts, it is generally undesirable to utilize browning agents having high concentrations of sugar and salt as contemplated by Moody.

Others have attempted to improve the browning of microwavable food products through the use of a container composed of a microwave-interactive material which converts microwave energy into thermal energy. Typically these containers utilize one or more microwave-interactive "heater boards" positioned beneath and/or above the food product. In most cases the food product sits directly on the heater board surface which surface becomes hot when exposed to microwave energy. The heater boards thus act to brown the food product by conduction (i.e., contact) heating. Patents disclosing containers having a microwave-interactive layer include U.S. Pat. Nos. 4,555,605 to Brown et al., 4,590,349 to Brown et al., 4,594,492 to Maroszek, and 4,190,757 to Turpin et al.

Similarly, U.S. Pat. No. 4,626,641 to Brown discloses a paper board carton useful for crisping and browning the crust of a food product such as a pot pie. The pot pie is cooked within the carton. In certain embodiments, Brown discloses a pot pie tray constructed of paper board which is lined with a microwave-interactive material. During microwave heating of the pot pie, the tray generates heat causing the exterior of the bottom crust to become crisp. Other embodiments are shown wherein a layer of microwave-interactive heater board material is provided on the interior surface of the top of the pot pie carton for crisping the top crust of the pot pie by convection and radiant heating.

U.S. Pat. No. 4,448,791 discloses a reactive dough composition which undergoes chemical surface browning upon exposure to microwave energy alone. The reactive dough composition is typically used as a coating layer on a conventional pie crust dough. The reactive coating composition contains a reducing sugar such as dextrose and an amino acid source such as a yeast extract, which when heated together produce a browning reaction known as the "Maillard Reaction." The reactive dough compositions disclosed in this patent are used to coat the top crusts of meat pies.

In spite of these advances in the art of microwave-baked pastry crust, there has still been a need in the art for a method of baking and browning a bottom pie crust in food products such as meat pies, frut pies, quiches and the like, which dough is baked from a raw state in a microwave oven and which exhibits the desired golden brown color which is characteristic of bottom crusts baked in conventional convection ovens.

SUMMARY OF THE INVENTION

Accordingly, it is an object of the present invention to develop food products having bottom crusts suitable for microwave cooking which products heretofore were primarily cooked only in conventional ovens due to lack of browning reactions in the crust during microwave cooking.

It is a further object of the present invention to provide a dough composition for the bottom crust of a food product and a method of baking same in a microwave oven to produce cooked products having a bottom crust with an aesthetically pleasing golden brown appearance.

In accordance with these and other objects which will be readily apparent to those skilled in the art, the present invention provides a pie product having a bottom crust which is suitable for baking and browning in a microwave oven. The pie product includes a tray having an interior surface which supports the pie. The tray is composed of a microwave-interactive heater board material which becomes heated when exposed to microwave energy. A heat-conductive release coating is interposed between the tray and the bottom crust dough. The pie also contains a filling of less than about 90 weight percent water. The bottom crust is formed from a dough-base having added thereto a reducing sugar and an amino acid source in amounts sufficient to promote chemical surface browning reactions during the microwave exposure period.

A dough conditioner is preferably added to the dough-base in an amount sufficient to prevent shrinkage (i.e. reduction in volume) of the dough during microwave cooking. In addition, a leavening agent capable of generating a gas when ixed into the dough-base is also preferably added to the dough-base in an amount sufficient to form small gas bubbles within the dough during dough formation. These gas bubbles are responsible for transforming the crust into a gas-filled cellular structure (i.e. a puff crust) during microwave cooking.

The present invention also provides a method for microwave baking and browning of the bottom crust of a pie containing a filling of less than about 90 wt. % water. The pie is supported on a tray composed of a microwave-interactive heater board material. A heat-conductive release coating is interposed between the tray and the bottom crust dough so that the tray is in heat-conductive contact with the bottom crust. Preferably the heat-conductive release coating is selected from animal fats, vegetable oils and derivatives thereof. The heat-conductive release coating may also be formed in situ by excess shortening migrating from the bottom crust dough during microwave baking. The bottom crust is formed by adding to a dough-base a reducing sugar and an amino acid source in amounts sufficient to promote chemical surface browning reactions during the desired microwave exposure period.

A dough conditioner is preferably added to the dough-base in an amount sufficient to prevent shrinkage of the dough during the desired microwave exposure period. A chemical or biological leavening agent is preferably addded to the dough-base in an amount sufficient to form gas bubbles when mixed into the dough-base. The trapped bubbles transform the crust into a gas-filled cellular structure during the desired microwave exposure period.

The bottom crust is baked and browned by exposing the pie and the tray to microwave energy for a period of time sufficient to bake and brown the bottom crust. During microwave baking, the pie and tray are preferably insulated from any heat sinks such as a ceramic dish or a surface of the microwave oven itself. The vertical positioning of the pie and tray within the microwave oven is preferably optimized during microwave baking as described hereinafter.

BRIEF DESCRIPTION OF THE DRAWING

The FIGURE is a sectional side view of a pie, having both a bottom and a top crust, within a pie tray positioned on top of a microwave heating stand.

DETAILED DESCRIPTION

The present invention finds particular utility in the preparation of frozen food products which contain unbaked (ie, raw) bottom crusts. Examples of this kind of product include frozen and unfrozen pies, such as meat pies, fruit pies, quiches, pizza pies and the like. For convenience, the invention will be described hereinafter primarily with respect to a particular product—a crust for frozen pies. The description of this product and its method of production will readily suggest to one skilled in the art how similar products and processes employing the bottom crust doughs of the present invention may be used.

As used herein, the terms "bottom crust dough" and "bottom crust" refer to those portions of pie doughs, and the crusts formed therefrom upon baking the dough, which are normally in contact with a support such as a pie plate or tray. Thus, the term "bottom crust" encompasses the crust portions along both the bottom and the sides of typical fruit and meat pies (for example, the crust portions designated as 11 in the FIGURE) but does not encompass the crust portions positioned over the top of typical fruit and meat pies (for example, the crust portion designated at 12 in the FIGURE).

The present invention, in its broadest application, comprises a microwave heater board tray supporting a bottom crust of a pie-like food product, with a heat-conductive release coating interposed therebetween, the crust containing a pie filling comprising less than 90% by weight of water.

The conventional ingredients of the dough-base used to make the bottom crust of the present invention are flour, water and fat or shortening material. In general, any flour product conventionally employed in the food industry may be utilized in producing the dough-base. While wheat flour, optionally bleached, is preferred due to consumer preferences, other grain flours including mixtures thereof may similarly be utilized. The fat material may be any solid or liquid edible fat of either animal or vegetable origin. The term "shortening" as used hereinafter is intended to encompass all of the various animal or vegetable fat materials commonly employed for this purpose.

In addition to these basic ingredients, any of the commonly employed additives used in dough formulation may be incorporated in the reactive dough composition of the present invention as long as they do not adversely affect the browning reactions which occur. For example, additives which affect the flavor, color and/or aroma of baked products may be employed in conventional fashion and in conventional amounts. For example, the dough-base typically contains up to about 1% by weight of salt, usually NaCl, for flavoring purposes.

The relative proportions of the dough-base ingredients can vary widely depending on the nature of the product to be produced. Typically, dough-base formulations intended for pie crusts will contain flour in an amount of from about 30–60% by weight, preferably from about 45–55% by weight; shortening in an amount from about 5–40% by weight, preferably from about 25–35% by weight; and water in an amount from about 10–30% by weight, preferably about 15–20% by weight.

The proteins in wheat flour have a special property that, when hydrated with water and mixed into a dough, form a viscoelastic matrix known as "gluten." Proper gluten formation is dependent on the water-to-flour ratio. Excessive water in the dough-base mix results in a dough with no elasticity due to the breakdown of gluten during mixing. Insufficient water results in a dough-base with poor or no gluten formation. The dough shortening (fat) affects crumb formation. Insufficient fat results in a crust with no flakiness. Excessive fat results in a crust that is too tender to handle. The dough-base composition used to make the bottom crust dough of the present invention may be prepared by any of a number of well known processing methods. In general, these methods comprise combining the various ingredients followed by kneading or mixing to achieve a dough-base composition having proper uniformity and consistency.

Mixing of the various ingredients may generally be carried out in any manner known to those skilled in the art. The dough mixing can be carried out in any commercially available mixing equipment, such as a Hobart paddle mixer or a dough mixer equipped with a sigma blade kneader or Dell mixer. The one-step ingredient mixing is immediately followed by multiple sheeting steps. More detailed descriptions of preferred methods of preparing a suitable dough-base composition are set out in the Examples.

When the dough-base, used to produce the bottom crust dough of the present invention, is used by itself (i.e., without further additives) as a bottom crust dough for a frozen meat or fruit pie, it develops a golden brown color when baked in a conventional oven at 425° for 45 minutes. However, the same dough-base as the bottom crust dough for a frozen meat or fruit pie baked in a microwave oven, will neither crust or brown.

In order to obtain the brownable bottom crust dough of the present invention, essential reactive components must be added to the dough-base. These essential reactive components include (a) a reducing sugar and (b) amino acid source in amounts sufficient to promote chemical surface browning reactions during the desired microwave exposure period. It is also preferably to add several other components to the dough base which contribute to the browning of the bottom crust and which provide the bottom crust with desirable properties such as a puff structure. These additional preferred components include (i) a dough conditioner in an amount sufficient to prevent shrinkage of the dough during the desired microwave exposure period, and (ii) a leavening agent in an amount sufficient to form gas bubbles when mixed into the dough-base, which bubbles transform the crust into a gas-filled cellular structure (i.e., a puff structure) during the desired microwave exposure period.

Unlike the reactive dough composition disclosed in U.S. Pat. No. 4,448,791 which undergoes only Maillard-type browning upon exposure to microwave energy, the bottom crust dough of the present invention is browned by a combination of browning mechanisms, including: (1) Maillard-type (i.e., low temperature) browning reactions occuring upon exposure of the bottom crust dough to microwave energy which causes water in the dough to become heated which in turn causes the dough to become heated, and (2) caramelization (ie, high temperature) browning reactions occuring due to heat conducted from the tray into the bottom crust dough. In order to provide the second of these two heating mechanisms, the pie tray must be at least partially composed of microwave-interactive heater board material. Furthermore, the tray must be in intimate heat-conductive contact with the bottom crust dough.

The microwave-interactive material used in the pie tray converts a substantial portion of the microwaves which impinge upon it to heat. One example of a microwave-interactive material is a metalized layer of polyester film. The film may be provided as a layer within a paperboard or cardboard laminate but preferably the film is adhered to the interior surface (i.e., the surface supporting the bottom crust dough) of a pie tray composed of paperboard, cardboard or the like. Microwave-interactive materials that may be used include those disclosed in U.S. Pat. Nos. 4,190,757 and 4,641,005, the disclosures of which are incorporated herein by reference. Preferably, the microwave-interactive material is provided over the entire interior surface of the pie tray that is in contact with the bottom crust. This promotes more even browning of the bottom crust and achieves a more desirable browned appearance in the baked product. Those skilled in the art will be able to determine the necessary amount of microwave-interactive material to use in the pie tray based on considerations such as tray size and shape, the size and type of pie being heated, the power rating of the oven, the positioning of the microwave-interactive material within the walls of the tray and the conversion efficiency of the particular microwave-interactive material utilized. Preferably, the tray containing the microwave-interactive material should be able to achieve an interior surface temperature of at least about 400° to 450° F.
when an empty tray is heated in a microwave oven on a high power setting. During microwave heating of a fruit or meat pie, the surface temperature of the tray should typically be able to reach a temperature of at least about 250° to 300° F.

Under the microwave baking conditions present in a microwave oven (i.e. combined heating of the bottom crust dough by microwave irradiation and by heat conduction from the microwave-interactive material in the tray) the reducing sugar and amino acid containing material chemically react at the surface of the dough to provide a browning reaction which changes the appearance of the bottom crust dough to that of a dough product baked in a conventional oven. It is believed that the browning reaction that occurs in the dough is due in part to the heating of the reducing sugar in the presence of amino acids. This type of reaction is referred to as the "Maillard Reaction." The rate of this browning reaction is dependent upon a number of factors such as temperature, pH, concentration, water activity, oxygen supply and the nature of the raw materials.

The amino acid source useful according to the present invention is any material which contains or provides sufficient amino acid content to undergo the desired chemical browning reaction with the reducing sugar in the microwave environment. Among the suitable amino acid sources are whey solids (either sweet or acid wheys), hydrolyzed plant proteins and yeast derivatives such as yeast autolysates or yeast extracts. One preferred amino acid source is sweet whey powder. Commercially available sweet whey powder is a by-product of the manufacture of cheddar cheese, having a solids content of about 95% and generally contains about 10-30% protein (such as lactoglobulin, lactalbumin and casein) which are broken down into free amino acids when heated in the microwave oven. Typically, sweet wheys contain about 10% free amino acids.

Another suitable amino acid source is a yeast extract produced by heating yeast concentrate to promote enzymatic autolysis of the proteins present to free amino acids. Commercially available yeast extracts generally contain from about 15% to over 50% free amino acids, depending on specific processing conditions. Typically, these yeast extracts can contain from about 65% to 80% solids.

Another essential component of the bottom crust dough of the present invention is a reducing sugar. The reducing sugar component can comprise any of the known reducing sugars such as dextrose (e.g., from corn syrup), maltose, fructose, lactose and the like or mixtures thereof. The rate of browning during microwave cooking may vary somewhat depending on the particular reducing sugar employed.

Whey solids, which contain free amino acids and a reducing sugar (lactose), can be used as a combined source of amino acids and reducing sugar.

A preferred component of the bottom crust dough of the present invention is a dough conditioner. A common phenomenon when baking raw pie dough in a microwave oven is dough shrinkage, which in extreme cases can cause the crust to split and even to lift away from the pie tray. The dough conditioner prevents shrinkage of the dough and its attendant problems. Examples of suitable dough conditioners include hydrolyzed starches and sodium bisulfite. A particularly preferred dough conditioner is a dextrinized starch, sold under the tradename Dextrin 700 by D. D. Williamson Co., Inc. of Louisville, KY. Dextrin 700 is a dough conditioner which improves the volume, grain, texture and consistency of the dough.

Another preferred component of the bottom crust dough of the present invention is a leavening agent which will generate small gas bubbles upon being mixed into the dough. Either a chemical leavening agent or a biological leavening agent such as yeast can be used. Examples of chemical leavening agents include baking soda (which is substantially 100% $NaHCO_3$), baking powder, potassium bicarbonate and ammonium bicarbonate. Of these, baking powder is most preferred. Baking powder consists essentially of about 40-50% of an acid leavening agent (such as sodium acid pyrophosphate) and about 20-30% of sodium bicarbonate (i.e., baking soda) with the remainder as cornstarch. The chemical leavening agent is believed to react with the dough which is typically at a pH of between about 5-6 with the attendant formation of carbon dioxide gas. The release of carbon dioxide forms a multiplicity of small bubbles or pockets of gas trapped within the dough. During microwave heating, the gases trapped within the dough expand, transforming the dough into a gas-filled cellular structure thereby imparting the desired puffed characteristic to the bottom crust during microwave baking.

Another advantage of using a chemical leavening agent such as a bicarbonate is that the bicarbonate helps catalyze the caramelization browning reactions occurring in the bottom crust dough, permitting the reactions to occur at lower temperatures as is described in more detail hereinafter.

In the bottom crust dough of the present invention, the relative proportions of the various components can vary widely depending on the nature of the product employing the dough. It is necessary, however, for the reducing sugar and amino acid components to be present in an amount which is sufficient to affect the chemical reactions which cause surface browning of the bottom crust dough. A typical bottom crust dough according to the present invention will contain at least about 1% and preferably about 4% by weight of the reducing sugar component. In general, the reaction stoichiometry is such that, at a minimum, whey solids should be present at a level which will provide a ratio of reducing sugar solids to whey solids from about 2:1 to 4:1.

To affect the browning reaction, sweet whey solids typically should be present by weight in amounts of at least about 0.5% (solids), and preferably the whey solids are employed at concentration levels of from about 0.1 to 5% with most preferred levels being in the range of about 0.5 to 3%. When an amino acid source other than sweet whey solids is employed, the ratios and amounts described herein can be adjusted up or down based on the amount of available amino acid present. It has been found that the time necessary to achieve the chemical browning reactions is in part dependent on the whey solids concentration in the reactive dough composition. In general, the higher the whey solids content the faster the browning reaction proceeds. Selection of proper whey solids levels also can be influenced by the conditions of the microwave baking, such as baking time, oven power level, and whether or not the product is covered during baking.

Depending on the desired characteristics of the bottom crust dough, the relative proportion of flour, water and shortening may vary widely. In the preferred embodiment, the bottom crust dough is formulated to provide a material having sufficient structural integrity to allow rolling, sheeting, cutting and pie assembly in a conventional fashion. Accordingly, the bottom crust dough of the present invention can contain from about 30% to 60% and preferably from 45% to 55% flour, from about 5% to 40% shortening, and preferably from about 15% to 20% water and up to about 1% salt for flavoring purposes.

In order for the final cooked product to exhibit the appropriate pastry-like characteristics it is preferred that the water content of the bottom crust dough be maintained in the range from about 15% to 20% after formulation of the composition, especially if the product is frozen for subsequent use. The dehydrating atmosphere present in a freezer substantially reduces the moisture content of a frozen product exposed to this environment. If means are not taken to keep the moisture content in the desired range, the texture and browning of the crust may be impaired. Protection can be achieved by placing products containing the bottom crust dough of the present invention in a sealed carton or preferably in hermetically sealed packages.

In general, any method which will suitably produce a stable homogenous mixture of the above-described dough components can be utilized to prepare the bottom crust dough of the present invention. Preferably, the bottom crust dough components are maintained at a reasonably low temperature during dough formation. In general, a temperature in the range from about 50° to 60° F. should be maintained throughout the dough formation. One suitable way of facilitating this low temperature mixing is to use recipe water which has previously been chilled to about 50° F. Additional cooling can be effected by chilling the other ingredients of the mixture prior to their combination. The Examples illustrate preferred methods of forming these mixtures.

In order to obtain the desired browning of the bottom crust dough of the present invention during microwave baking, the water content of the pie filling must be less than about 90 wt. % water, preferably less than about 80 wt. % water and most preferably less than about 70 wt. % water. In general, pie fillings having a lower water content achieve better browning of the bottom crust than pie fillings having a higher water content. In typical meat pie formulations, the filling consists of diced meat and vegetables in a gravy base and comprises about 80 wt. % water. Some starch is generally present which acts as a water binder. Typical fruit pie fillings contain about 70 wt. % water and sugar which also acts as a water binder. The degree of water activity in the pie filling can also affect the degree of browning in the bottom crust dough of the present invention. Pie fillings having lower water activity give better bottom crust browning than pies utilizing fillings having a higher water activity. Thus, between two pies with fillings of equal water content, the pie with the filling containing a strong water binder, such as sugar, will give better bottom crust browning than the second pie with a filling containing a weak water binder, such as starch.

The heat-conductive release coating interposed between the surface of the tray and the bottom crust dough may be broadly selected from animal fats, vegetable oils, derivatives of animal fats and vegetable oils and mixtures thereof. A particularly effective coating comprises lecithin, a phosphatide which is found in plant and animal tissues and is produced commercially from egg yolks, soy beans and corn. A commercial lecithin-containing product is sold by Boyle-Midway, Inc. of New York, NY under the tradename PAM. This product may simply be sprayed over the interior surface of the pie tray before laying the bottom crust dough therein.

Alternately, the heat-conductive release coating interposed between the surface of the tray and the bottom crust dough may be formed in situ during microwave baking. The in situ coating forms when excess shortening migrates out of the bottom crust dough during microwave baking. The bottom crust dough must contain sufficient shortening in order to achieve this migrating effect. Generally, the level of shortening in the dough should be above that necessary to achieve migrating during microwave baking and below that which would create difficulties during dough handling (i.e., during the sheeting operations). Preferably, the level of shortening in the dough should be between about 25% and 40% by weight. Bottom crust doughs having shortening levels within this range will migrate sufficient shortening during microwave baking to form a heat-conductive release coating interposed between the tray and the bottom crust dough.

The heat-conductive coating also contributes to the browning of the bottom crust by conducting heat generated by the microwave-interactive heater board tray into the bottom crust dough. Thus, the pie tray becomes heated during microwave cooking due to the microwave-interactive material, which in turn heats the oil which fries the surface of the bottom crust. The frying of the surface of the bottom crust causes the dough to reach much higher temperatures than would otherwise occur without the microwave-interactive tray. These higher temperatures cause the sugar(s) in the dough to undergo a caramelization reaction. The dough sugars should reach a temperature of at least about 250° F. before caramelization occurs. This minimum caramelization temperature cannot generally be achieved without the use of the microwave-interactive heater board tray. Dough sugars which undergo caramelization include the reducing sugar (such as dextrose in corn syrup) and, in the case of a bottom crust dough formulated with whey solids, sugars such as lactose.

When sodium bicarbonate is used as the leavening agent, the bicarbonate also acts as a caramelization catalyst, allowing the caramelization reactions to proceed at lower temperatures which are well within the range generated by the microwave-interactive heater board materials. The caramelization reactions contribute to the desirable golden brown color obtained during microwave baking of the bottom pie crust according to the present invention.

The oil or fat coating has an additional advantage in that it reduces the tendency of the baked crust to stick to the tray, thereby making it easier to remove the pie from the tray after microwave baking without damaging the crust.

It is generally preferred to apply a separate heat-conductive release coating to the tray surface, rather than have the coating form in situ, in order to reduce sticking of the bottom crust to the tray. A particularly preferred release coating comprises a lecithin-containing material, such as PAM, which in addition to providing a heat-conductive layer between the bottom crust dough and the tray, also reduces sticking therebetween. The coating material enhances heat transfer from the tray to the baking dough by providing a good heat conduction path and by eliminating air pockets which exist between the tray and the dough.

During microwave baking of the pies of the present invention, it is greatly preferred to insulate the pie and the tray from any heat sink, such as the bottom of the microwave oven or a ceramic dinner plate, glass tray, etc. Otherwise, there is a tendency for heat generated by the microwave-interactive material to be conducted into the heat sink rather than into the pie, resulting in inadequate heating and browning of the bottom crust. Preferably, the pie tray is elevated above the microwave oven floor by an oven rack or some other type of microwave heating stand which minimizes the amount of heat conducted away from the tray. A particularly preferred microwave baking stand, from both a cost and manufacturing standpoint, is simply the carton in which the pie is shipped and sold.

The vertical positioning of the pie and tray within the microwave oven during baking can have an effect on the baking and browning of the bottom crust dough of the present invention. Although the construction of microwave ovens varies from manufacturer to manufacturer, it has generally been found that the bottom of the pie tray should be elevated from about ½ to 4 inches, and preferably about 1 to 3 inches, above the metal floor of the microwave cavity of the microwave oven. In certain model ovens, the metal floor is coextensive with the bottom of the cooking chamber. In other models, the microwave cooking chamber is provided with a plastic, glass or ceramic floor (these floors being transparent to the microwave energy) which is typically elevated up to about 1 inch above the metal floor of the microwave cavity. Thus, in microwave ovens in which the floor of the cooking chamber is coextensive with the metal floor of the microwave cavity, the pie should be elevated a distance of at least about 1 inch above the floor. On the other hand, in microwave ovens having a cooking chamber with a plastic, glass or ceramic floor elevated a distance about 1 inch above the metal floor of the microwave cavity, the pie need not be elevated above the plastic, glass or ceramic floor, other than to insulate the tray from the floor which acts as a heat sink.

Referring now to the figure, there is shown a pie 10 having a bottom crust 11 made according to the present invention, a top crust 12 and a filling 13. Pie 10 sits within a pie tray 20 at least partially composed of a microwave-interactive heater board material. Tray 20 may be composed entirely of the microwave-interactive material or may be composed of a composite such as a paperboard or cardboard tray having an interior coating layer of a microwave-interactive material such as that described in U.S. Pat. No. 4,641,005. Preferably, the microwave-interactive material is provided at the interior surface 21 of tray 20.

Interposed between the interior surface 21 of the microwave-interactive material-containing tray 20 and the bottom crust 11 is provided (or is formed) a layer of an animal fat, vegetable oil, or a derivative such as lecithin. Heat-conductive coatings composed of materials other than the dough shortening (such as lecithin) must generally be applied to the surface 21 before placing the bottom crust 11 within tray 20. The lecithin coating promotes heat transfer from the tray 20 to the bottom crust 11 during microwave baking of pie 10. The lecithin coating also helps prevent the bottom crust 11 from sticking to tray 20, thereby aiding the removal of pie 10 from tray 20 after completion of baking.

Tray 20 is shown resting on top of carton 30 which is typically formed of cardboard or the like and is the package used in shipping and selling the pie 10. Package 30 comprises a convenient microwave baking stand for insulating the microwave-interactive material-containing tray 20 from the bottom surface 32 of the microwave oven. Package 30 preferably has a height of at least about 1 inch in order to position pie 10 at an optimal elevation above surface 32, especially in instances where surface 32 is the metal floor of the microwave cavity of the oven.

The incorporation of the bottom crust dough according to the present invention into a typical frozen pie will now be described. In the preparation of frozen pies, the first step involves sheeting and cutting of the bottom crust dough into a size and configuration suitable for lining the interior surface 21 of pie tray 20. In the preferred manner, the bottom crust dough of the present invention is sheeted to a thickness of about 4 mm. After the bottom crust dough is in position lining the interior surface 21 of pie tray 20, a suitable pie filling having a moisture content of less than 90 weight % is introduced. The bottom crust and filling are then frozen.

Optionally, a top crust 12 may be utilized. While in most meat and fruit pie formulations a top crust is utilized, in certain types of fruit pies and in quiches, no top crust is used. When used, the top crust may be a composite pastry crust such as is described in U.S. Pat. No. 4,448,791. When utilizing the optional top composite crust 12, the top crust dough is sheeted to an appropriate thickness and a suitably shaped portion is placed on top of the frozen pie 10. The top crust dough can be trimmed and crimped against the lip of the side wall of the tray 20 or to the edge of the bottom crust dough in order to seal in the pie filling 13.

The resulting pie can then be frozen and maintained in the frozen state until immediately prior to cooking. Typically, the pies will be frozen to a temperature which does not exceed 32° F. and preferably is in the range of about −10° to 10° F., with the most preferred freezing temperature being about 0° F.

While the invention has been described in connection with the microwave baking of frozen pies, it is also possible to prepare products containing the raw bottom crust dough of the present invention and cook them immediately without freezing or storage.

Frozen and thawed pies of the present invention containing the microwave bakable and brownable bottom crust may be cooked in any microwave oven utilizing conventional time-temperature relationships which will vary depending upon the nature and size of the frozen pie. During microwave baking the surface layer of the bottom crust dough undergoes the above-described crusting and browning chemical reactions. The result is a bottom pie crust which has the appearance, taste and texture of a crust which has been freshly baked in a conventional oven and which is markedly superior to conventional frozen pie crusts even when thawed and baked in a conventional oven.

It is, of course, possible to bake the pies produced according to the present invention in conventional ovens. For example, a pie having a microwave brownable bottom crust dough of the present invention may be cooked in a conventional oven for about 45 minutes at a temperature of about 400° F. as long as the highly reactive top crust dough (if any is used) is shielded using an aluminum foil covering or the like. After the 45 minute baking period, the aluminum foil covering can then be removed and the pie baked for an additional 5 to 10 minutes until the top crust is suitably browned. In the case of pie trays containing paperboard or cardboard materials, the pie is preferably baked in a conventional oven while sitting on a metal cookie sheet or the like.

The following examples are intended to illustrate more fully the nature of the present invention without acting as a limitation on its scope.

EXAMPLE 1

This Example demonstrates the preparation of a bottom crust dough suitable for incorporation into a meat or fruit pie according to the present invention. The following ingredients were chilled to an initial temperature of about 50° to 60° F.:

| INGREDIENTS | PARTS BY WEIGHT |
| --- | --- |
| pie dough flour (amino acid source) | 54.0 |
| whey solids (amino acid and reducing sugar source) | 0.9 |
| shortening (Colfax) | 22.5 |
| dextrinized starch (Dextrin 700, sold by D. D. Wiliamson & Co. of Louisville, KY) | 0.5 |
| $NaHCO_3$ (i.e., baking soda) | 0.3 |
| salt (NaCl) | 0.9 |
| corn syrup (50% dextrose equivalent) | 2.6 |
| water | 18.3 |

The pie dough flour and shortening were combined in a Hobart paddle mixer bowl and mixed for about 30 seconds on low speed. The recipe water and the remaining ingredients were then added and mixing continued at low speed for one minute. The resulting dough was removed from the mixer and placed on a wax paper surface. The top and bottom surfaces of the dough mass were immediately dusted with flour and the dough was fed through a dough sheeter set for an 8 millimeter thickness. The dough sheet was then cut into 4×4 inch squares and sheeted again at a 5 millimeter thickness, with a final sheeting operation producing a layer having a thickness of 3 to 5 millimeters.

EXAMPLE 2

This example demonstrates the preparation and cooking of meat pies utilizing the bottom crust dough prepared in Example 1. The sheeted and cut bottom crust doughs produced in Example 1 were placed in 20 microwave-interactive heater board pie trays. The pie trays each had a top diameter of about 5.1 inches, a height of about 1.2 inches a thickness of about ¼ inch and an average weight of about 9.7 grams. The trays had a laminate construction with a metalized PET (polyethylene terephthalate) layer adhered to a paperboard layer having a weight of 90 lbs./1000 ft². Prior to placing the bottom crust doughs in the pie trays, the interior surface of each tray was sprayed with between 0.1 and 0.5 grams of PAM, an aerosol product containing lecithin, soybean oil and alcohol as a carrier. The trays lined with the bottom crust dough of Example 1 were then filled with a chicken filling. The filling was produced by combining 246 grams of cooked chicken meat (diced, ½ inch cut) with 1030 grams of cooked pie garnish (vegetables in a gravy base), and the meat and garnish were mixed until the meat portion was uniformly distributed. The filling had a water content of approximately 80 weight percent. Approximately 180 grams of the filling were then placed in each of the pies and frozen to a uniform temperature of about 0° F.

Next, an approximately 30 gram portion of a top crust composite dough prepared substantially in accordance with Examples 1 and 2 of U.S. Pat. No. 4,448,791 was placed on each frozen pie and the edges of the top crust dough were trimmed and crimped against the tray lip. The resulting pie was frozen at 0° F.

Each of the above-described frozen pies was individually baked for 8 minutes in a microwave oven at high power setting. The pies were positioned directly in the center of the microwave cooking chamber and were placed on a cardboard box having a height of 1¼ inches. Four different microwave ovens were used to bake the 20 pies: (i) Magic Chef, Model No. M61A8P, rated at 700 watts; (ii) Panasonic, Model No. NE-7650A, rated at 700 watts; (iii) Litton, Model No. 540, rated at 700 watts; and (iv) Hitachi, Model No. MR-8030, rated at 750 watts. In these four ovens, the vertical distance between the metal floor of the microwave cavity and the plastic, glass or ceramic floor of the microwave cooking chamber ranged between zero (i.e., coextensive floors) and one inch. Accordingly, the bottom of each of the twenty pies was elevated a distance between 1¼ and 2¼ inches above the metal floor of the microwave cavity. The bottom crust of all 20 meat pies baked and browned sufficiently during the 8 minute microwave cooking period. The resulting bottom pie crusts had the appearance, flavor and texture of a freshly baked pie crust.

EXAMPLE 3

This example demonstrates the preparation and cooking of fruit pies utilizing the bottom crust dough prepared in Example 1. The sheeted and cut bottom crust doughs produced in Example 1 were placed in microwave-interactive heater board pie trays of the type used in Example 2. Prior to placing the bottom crust dough in the pie trays, the interior surface of each tray was sprayed with between 0.1 and 0.5 grams of PAM. The trays lined with the bottom crust dough of Example 1 were then filled with a commercial apple pie filling sold under the tradename Musselman's Apple Pie Filling, by Knouse Foods of Biglerville, PA. The pie filling had a water content of approximately 60 weight percent. Approximately 200 grams of the filling were then placed in each of the pies and frozen to a uniform temperature of about 0° F. None of the pies were provided with a top crust.

Each of the above-described frozen pies was individually baked for 8 minutes in a microwave oven at high power setting. The pies were positioned directly in the center of the microwave cooking chamber floor and were placed on a cardboard box having a height of 1¼ inches. The same four microwave ovens were used as in Example 2. Accordingly, the bottom of each of the 20 pies were elevated a distance between 1¼ to 2¼ inches above the metal floor of the microwave cavity. The bottom crust of all 20 fruit pies baked and browned sufficiently during the 8 minute microwave cooking period. The resulting bottom pie crusts had the appearance, flavor and texture of a freshly baked pie crust.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A pie product having an uncooked bottom crust dough which is suitable for baking and browning in a microwave oven, the pie product comprising:

(a) a tray for supporting the pie, the tray being composed of a microwave-interactive material and being in heat-conductive contact with the bottom crust dough;

(b) a heat-conductive release coating interposed between an interior surface of the tray and the bottom crust dough;

(c) the bottom crust dough comprising a raw dough-base containing a reducing sugar and an amino acid source in amounts sufficient to promote chemical surface browning reactions, the browning reactions including both Maillard-type browning and caramelization browning, during the desired microwave exposure period; and (d) a pie filling within the bottom crust dough, said filling comprising less than 90 wt. % water.

2. The pie product of claim 1, wherein the dough-base has added thereto a dough conditioner in an amount sufficient to prevent shrinkage of said dough during the desired microwave exposure period.

3. The pie product of claim 1, wherein the dough-base has added thereto a leavening agent in an amount sufficient to form gas bubbles when mixed into the dough-base, the bubbles transforming the crust into a gas-filled cellular structure during the desired microwave exposure period.

4. The pie product of claim 1, wherein the heat-conductive release coating is selected from the group consisting of animal fats, vegetable oils, derivatives of animal fats and vegetable oils and mixtures thereof.

5. The pie product of claim 4, wherein the release coating comprises lecithin.

6. The pie product of claim 4, wherein the heat-conductive release coating forms during microwave baking of the pie by excess shortening migrating from the dough.

7. The pie product of claim 1, wherein the filling comprises a meat pie type filling which contains about 80 to 85 weight % water.

8. The pie product of claim 1, wherein the filling comprises a fruit pie type filling with contains about 70 weight % water.

9. The pie product of claim 1, wherein the dough-base comprises pie dough flour, shortening, salt and water.

10. The pie product of claim 1, wherein the reducing sugar comprises dextrose.

11. The pie product of claim 1, wherein the amino acid source comprises whey solids.

12. The pie product of claim 2, wherein the dough conditioner comprises a dextrinized starch.

13. The pie product of claim 1, wherein the bottom crust dough comprises about 54.0 wt.% flour, about 0.3 wt. % baking soda, about 0.9 wt. % whey solids about 22.5 wt. % shortening, about 18.3 wt. % water, about 0.5 wt. % of a dextrinized starch, about 0.9 wt. % salt and sufficient reducing sugar to provide a ratio of reducing sugar solids to whey solids of about 1.4:1.

14. The pie product of claim 1, wherein the pie includes a top crust positioned over the filling.

15. The pie product of claim 14, wherein the top crust dough has a laminate structure comprising a conventional dough coated with a reactive dough containing a reducing sugar and an amino acid source in amounts sufficient to promote a chemical surface browning reaction during the desired microwave exposure period.

16. The pie product of claim 15, wherein the reducing sugar in the top crust dough is dextrose.

17. The pie product of claim 15, wherein the amino acid source in the top crust dough is yeast extract.

18. A method of baking and browning an uncooked bottom crust dough of a pie containing a filling of less than about 90 wt. % water by microwave energy comprising:
(a) supporting the pie on a tray composed of a microwave-interactive material, the tray having a heat-conductive release coating interposed between an interior surface of the tray and the bottom crust dough so that the tray is in heat-conductive contact with the bottom crust dough;
(b) forming the bottom crust dough by adding to a raw dough-base a reducing sugar and an amino acid source in amounts sufficient to promote chemical surface browning reactions, the browning reactions including both Maillard-type browning and caramelization browning, during the desired microwave exposure period; and
(c) exposing the pie and the tray to microwave energy for a period of time sufficient to bake and brown, by Maillard-type and caramelization browning reactions, the uncooked bottom crust dough to form a baked bottom crust.

19. The method of claim 18, wherein the heat-conductive release coating is selected from the group consisting of animal fats, vegetable oils, derivatives of animal fats and vegetable oils and mixtures thereof.

20. The method of claim 19, wherein the release coating comprises lecithin.

21. The method of claim 19, wherein the release coating forms during microwave baking of the pie by excess shortening migrating from the dough.

22. The method of claim 18, including the additional step of insulating the pie and the tray from heat-conductive contact with a heat sink during the desired microwave exposure period.

23. The method of claim 18, including the additional step of elevating the tray and the pie a vertical distance of about 1 to 4 inches above a metal floor of a microwave cavity in the oven.

24. The method of claim 23, wherein the additional step comprises placing the tray on a microwave heating stand.

25. The method of claim 24, wherein the stand comprises a carton for the pie.

* * * * *